C. BUCKLEY.
Method of Boring Wood Cylinders.
No. 198,344. Patented Dec. 18, 1877.
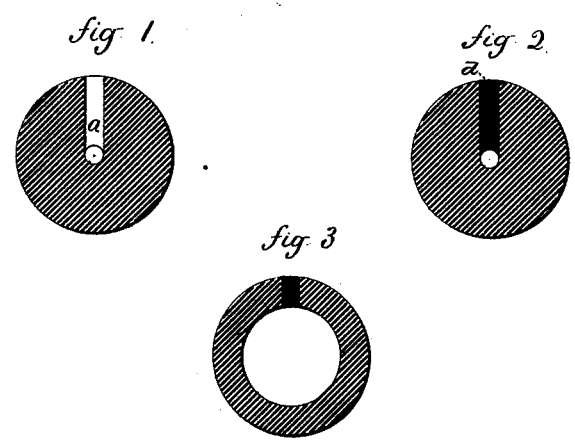
Witnesses.
Chauncey Buckley
Inventor
By Atty

UNITED STATES PATENT OFFICE.

CHAUNCEY BUCKLEY, OF MERIDEN, CONNECTICUT.

IMPROVEMENT IN METHODS OF BORING WOOD CYLINDERS.

Specification forming part of Letters Patent No. 198,344, dated December 18, 1877; application filed November 30, 1877.

*To all whom it may concern:*

Be it known that I, CHAUNCEY BUCKLEY, of Meriden, in the county of New Haven and State of Connecticut, have invented a new Improvement in Methods of Boring Wood Cylinders; and I do hereby declare the following, when taken in connection with the accompanying drawings and the letters of reference marked thereon, to be a full, clear, and exact description of the same, and which said drawings constitute part of this specification, and represent, in—

Figure 1, a transverse section of the roll after the first preparatory operation; Fig. 2, the same when fully prepared for boring; Fig. 3, a transverse section of the bored cylinder.

This invention relates to an improvement in boring wood cylinders longitudinally, or in the direction of the grain, with special reference to that class of curtain-rolls which are made in tubular form, to receive a spring to automatically roll the curtain, but is applicable to the boring of similar cylinders for other purposes.

The usual practice in boring such cylinders has been to guide the auger by outside influences as nearly as possible in the axial line of the roll, and when the grain is perfectly straight, or parallel with the axis, there is little difficulty in following the axis; but such a condition of the wood is seldom found, and the tendency of the point of the auger is to follow the grain of the wood. Hence it seldom occurs that the boring will be concentric with the roll throughout, and often cuts through to the outside and destroys the roll.

The object of this invention is to overcome this difficulty; and it consists in first cutting a longitudinal groove in the roll to a point beyond the center equal to half the width of the groove, then filling that groove down to a point toward the center, but so as to leave a longitudinal hole forming the axis of the hole to be bored, and as more fully hereinafter described.

The roll, produced in the usual or any desirable manner, is applied to any grooving-instrument, as a saw, which is gaged so as to cut a longitudinal groove, $a$, from the surface radially inward, and so as to pass the center. The distance beyond the center should be equal to half the width of the groove. Then, preferably, a wire is laid into this groove, the diameter of which corresponds to the width of the groove. Then the groove is filled by the introduction of a piece of wood or other material, $d$, down onto the wire. The wire is then withdrawn, which leaves a small concentric hole, to the depth of which the boring is to be made. The roll is then presented to the bit or boring-instrument in the usual manner, the center of which follows this concentric hole regardless of the surrounding grain, and thus insures a concentric-bored cylinder.

It is not essential that the wire be used, as the filling may be made of the required width and inserted flush with the surface of the cylinder; but the wire is the better plan, because less care need be exercised in filling.

It will be readily seen that this method of boring or preparation for boring is applicable to other uses than curtain-rolls. It is, therefore, not intended to limit this invention to any special purpose; and, also, that the bore is not necessarily concentric with the cylinder.

I claim—

The method herein described for the preparation of wood cylinders for boring, consisting in first grooving the cylinder, then filling so as to leave a hole to form the axis or guide for the boring-instrument, substantially as described.

CHAUNCEY BUCKLEY.

Witnesses:
RALPH A. PALMER,
HENRY C. PATTERSON.